United States Patent [19]

Wale et al.

[11] Patent Number: 4,843,928
[45] Date of Patent: Jul. 4, 1989

[54] MOUNTING OF TOOL BLADES

[75] Inventors: Dennis H. Wale, Melton Mowbray; Paul A. Reynolds, Oadby, both of England

[73] Assignee: Marwin Cutting Tools Limited, Rothley, England

[21] Appl. No.: 109,954

[22] Filed: Oct. 19, 1987

[51] Int. Cl.⁴ .............................................. B26D 1/12
[52] U.S. Cl. ........................................ 82/131; 407/34; 407/37; 407/40; 407/41; 407/63
[58] Field of Search .................... 82/2 E, 36 R, 36 A, 82/36 B; 407/34, 37, 40, 41, 42, 53, 59, 63

[56] References Cited

U.S. PATENT DOCUMENTS 3,831,327 8/1974 Gunsalus .............................. 407/41
3,861,011 1/1975 Nose ...................................... 407/41
4,341,493 7/1982 Erkfritz ................................ 407/41

Primary Examiner—Frederick R. Schmidt
Assistant Examiner—Blynn Shideler
Attorney, Agent, or Firm—Pearne, Gordon, McCoy & Granger

[57] ABSTRACT

The invention relates to a rotary tool having at least one replaceable cutting blade, the or each received in a channel and clamped firmly therein. The tool body has a passage in each channel which receives a safety member in the form of a pin projecting into a recess in the blade. In normal use the pin remains out of contact with the walls of the blade recess, engaging with the recess only if the clamping means fail, so as to restrain the blade from falling out of the channel.

8 Claims, 2 Drawing Sheets

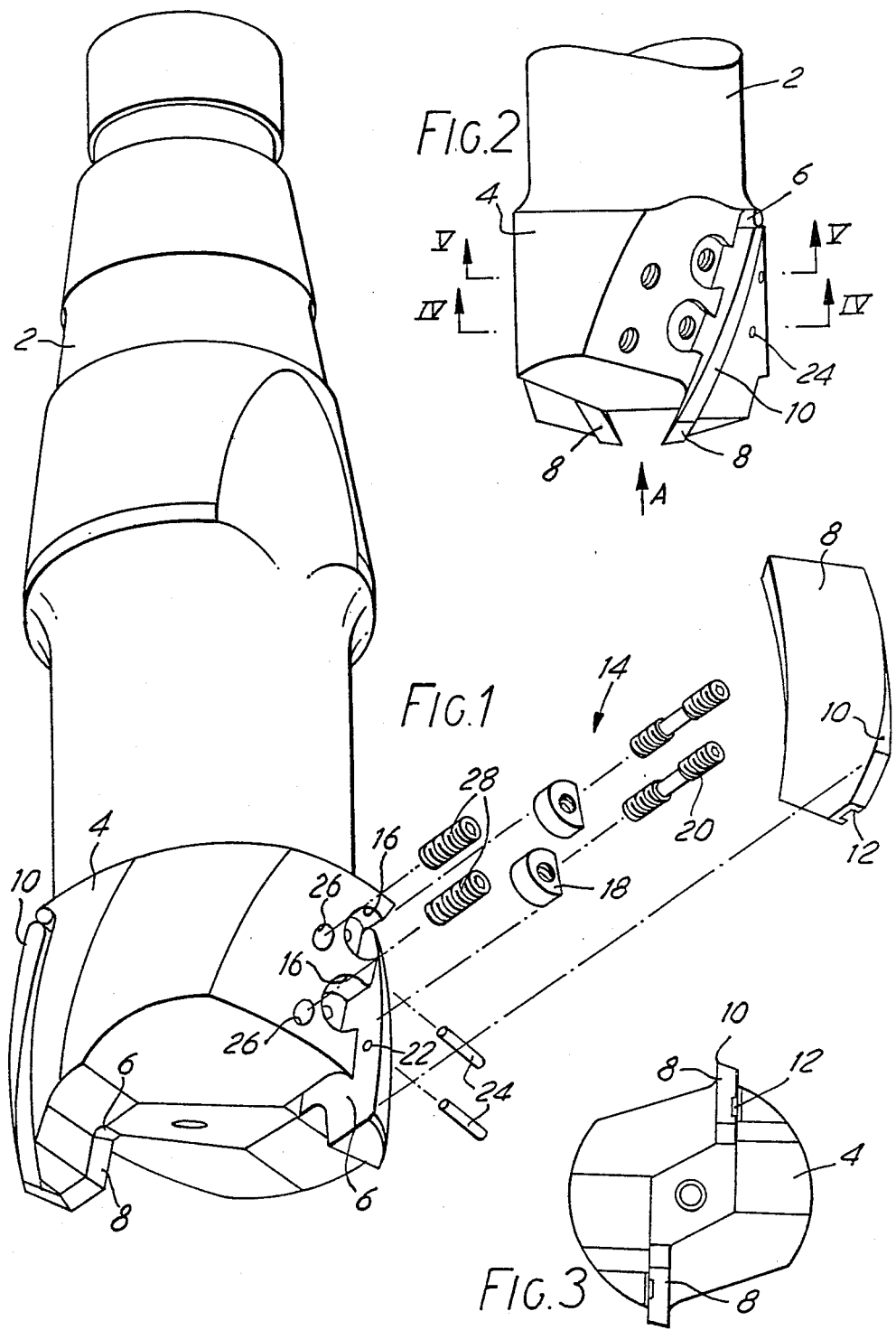

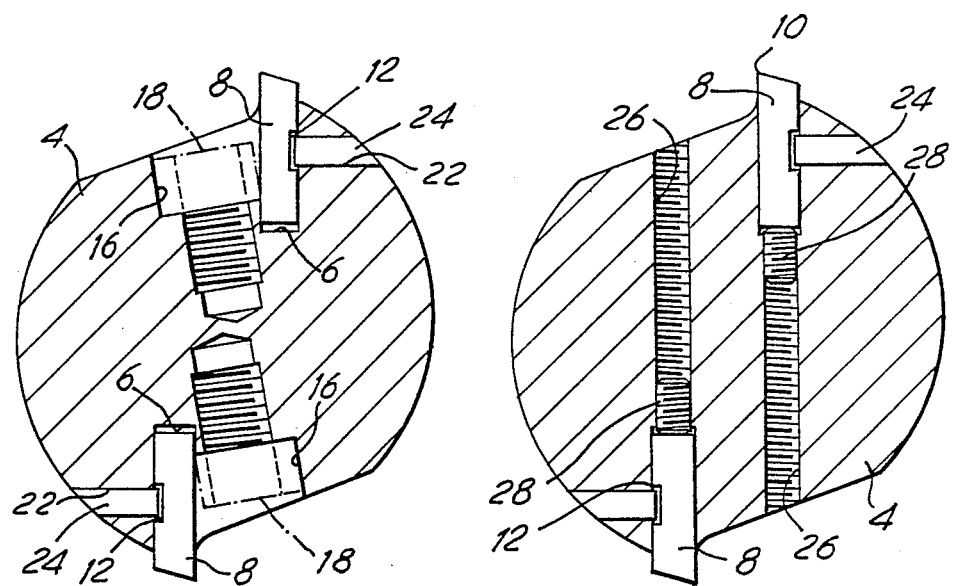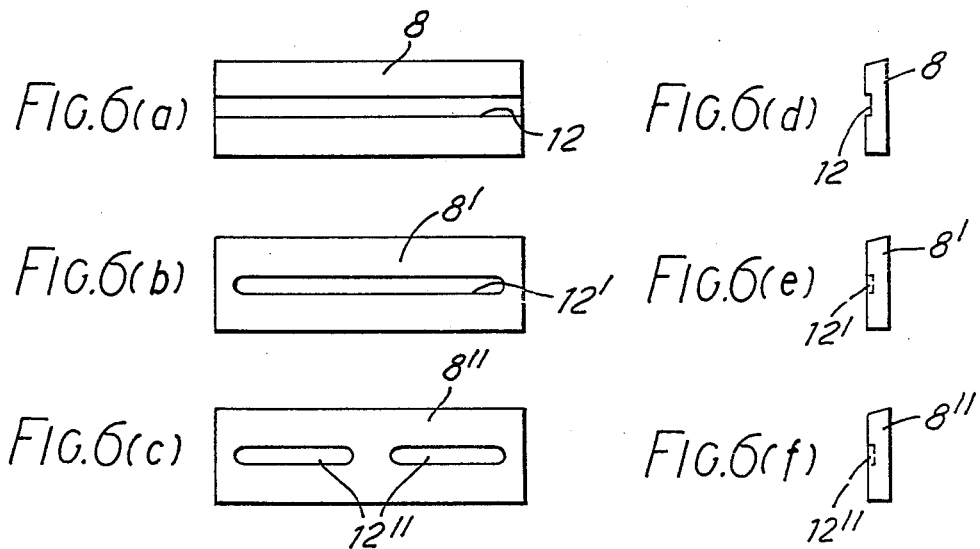

MOUNTING OF TOOL BLADES

BACKGROUND OF THE INVENTION

The invention is concerned with improvements in or relating to the mounting of tool blades in tools. More particularly, but not exclusively, the invention finds use in the mounting of one or more contoured blades in a tool body for use in a tool holder of a rotary machine tool for example for boring or milling. Such blades may be made for example from tungsten carbide, high-speed steel or from ceramic material.

It has been common practice to mount such blades in a tool body either in a permanent or replaceable manner. In the former case, the blades may be secured in a seating channel by brazing or bonding but considerable stresses are produced caused by differences in the coefficients of expansion of different metals. Stresses built up in a tool body and in the blade through repeated heating and cooling caused for example by the brazing process frequently cause fractures which necessarily result in rejection as unsuitable for subsequent use.

In the latter case, blades may be secured in the seating channel by clamping pressure exerted by screw wedge devices. If the pressure is too great, the blades may fracture in use or, if not firm enough the blades may come loose and be ejected from the tool body by centrifugal force. This possibility presents considerable risk of product damage or injury to factory personnel, since tool operating speeds may be between for example 6,000 r.p.m. and up to 30,000 r.p.m. or more.

BRIEF DESCRIPTION OF INVENTION

The invention provides a rotary tool comprising a tool body including at least one seating channel adapted to receive a cutting blade in a replaceable manner, a blade receivable in said channel and means for clamping the blade therein, said blade being provided with at least one recess in a surface thereof, said recess defining an air space below said surface communicating with the interior of said channel, a safety member permanently received within the passage so as to project therefrom into the interior of the channel and to enter the air space with the blade, the construction and arrangement being such that the safety member remains out of contact with walls of the blade recess while the clamping means is in an operative condition and engages said walls only when the clamping means fails.

Conveniently the safety member may be in the form of a projecting pin. The blade, which may be helical in configuration, may include a recess in the form of one or more elongate grooves.

Advantageously, the blade recess is positioned in a first surface of the blade opposite to a second surface thereof against which the clamping means operates. Preferably the clamping means clamp the first surface of the blade against the surface of the recess from which the pin is arranged to project. It will be understood that the pin is firmly bonded or otherwise fixed in the recess and is immovable either lengthwise of itself or rotationally. It will be appreciated that the pin is arranged to be out of contact with the walls of the blade recess, unless and until the clamping action fails or is released. In this way, it is ensured that no working stresses are transmitted to the pin during use of the tool so that in the event of failure of the clamping means the pin is not liable to metal fatigue or bond failure.

The invention further provides a rotary tool comprising a tool body including at least one seating channel adapted to receive a cutting blade in a replaceable manner, a blade receivable in said channel and means to clamp the blade therein, said blade having a cutting edge arranged at least partially to project from the tool body and a rear surface opposite said edge, the tool body being provided with a passageway substantially traversing the body in a plane passing through the longitudinal centre line of said channel and communicating with said channel at a region adjacent said rear surface of the blade, an adjustment member being received in said passageway and capable of lengthwise movement therein to project from the passageway into the channel by a pre-determined amount, the construction and arrangement being such that the extent of projection of the adjustment member into the channel determines the extent to which the blade cutting edge projects from the tool body and thereby determines the operative diameter of the rotary tool.

Conveniently the adjustment member is screw-threaded and readily accessible for adjustment, for example to compensate for wear on the blade cutting edge.

BRIEF DESCRIPTION OF DRAWINGS

There will now be described an example of a tool according to the invention. It will be understood that the description, which is to be read with reference to the accompanying drawings, is given by way of example only and not by way of limitation. In the drawings:

FIG. 1 is an exploded, perspective view of a tool body and blade;

FIG. 2 is a side view of the head of the tool body, to a slightly reduced scale;

FIG. 3 is a view of the tool body head in the direction of arrow A of FIG. 2;

FIGS. 4 and 5 are sections on lines IV—IV and V—V respectively of FIG. 2;

FIGS. 6a–c depict three alternative layouts of blade recess; and

FIGS. 6d–f are end view of the blades of FIGS. 6a–c respectively.

DETAILED DESCRIPTION OF THE EMBODIMENT

A tool body 2 shown in the Figures is provided in a head portion 4 thereof with two seating channels 6. In each channel is received a cutting blade 8. It will be understood that the number of blades used will depend on operating circumstances e.g. tool diameter and the metal of the workpiece, and may comprise one or more as necessary.

Each blade 8 comprises a cutting edge 10 of wear-resistant material, and conventionally follows a part-helical configuration. The blade 8 has two opposed surfaces, a first surface provided with an elongate recess in the form of a groove 12 as will be explained below and a second surface against which operate clamping means 14 now to be described.

In one side wall of the channel 6 are provided two recesses 16 each adapted to receive one of two wedge members or cotters 18 which are secured by double action locking screws 20 so that when fully tightened the cotters 18 firmly clamp the blade against the opposite side wall of the channel 6 (see FIG. 4). Nevertheless, it is possible for the clamping means 14 to work loose in use and therefore in the opposite wall of the channel 6 are provided two passages 22 into which are forced pin members 24 in an interference fit. If desired, a suitable cement may be used to bond the pin members 24 in place. Although the end portions of the pins enter the air space within groove 12 of the blade 8, so that even when the clamping means 143 have failed, the blade is retained within the seating channel 6 and is not flung out, it will be understood that the pin does not clamp the blade and should remain out of effective contact with the blade unless and until the clamping means fail.

It will be appreciated that in positioning the blade 8 within the seating channel 6, there is need to control the extent to which the cutting edge 10 protrudes from the channel so that it is possible accurately to determine the exact diameter of the bore being machined by the tool.

Two further passageways 26 are therefore provided in the tool head portion 4 each of which lies in the approximate plane of one of the channels 6 (see FIG. 5). An adjustment screw 28 is threaded in to the passageway 26 and projects into the channel 6 to a pre-determined extent which governs the effective depth of the channel. The amount by which the cutting edge 10 projects outwardly from the channel and therefore the operative diameter of the tool is thus controlled.

In the present example therefore each of the blades is positioned by two screws 28 and retained by two pins 24. The blade 8 illustrated in FIGS. 1 to 5 is provided with a continuous recess or groove 12, shown diagrammatically in FIG. 6(a). FIG. 6(b) shows an alternative, closed-ended groove 12' in a blade 8' and FIG. 6(c) shows two separate grooves 12", one for each pin 24 in a blade 8".

We claim:

1. A rotary tool comprising a tool body including at least one seating channel adapted to receive a cutting blade in a replaceable manner, a blade receivable in said channel and means for clamping the blade therein, said blade being provided with at least one recess in a surface thereof, said recess defining an air space below said surface and said tool body having therein a passage separate from the clamping means communicating with the interior of said channel, a fixed safety member permanently received within the passage so as to project therefrom into the interior of the channel and to enter the air space of the blade, the construction, arrangement and relative positions of the fixed safety member and the blade recess being such that the safety member remains out of contact with walls of the blade recess while the clamping means is in an operative condition and is maintaining the blade in a desired position for cutting, said safety member engaging said walls ony when the clamping means fails and the blade tends to more relative to the body from the desired cutting position to thereby restrain the blade against excessive movement from the desired cutting position.

2. A tool as claimed in claim 1, wherein the safety member is in the form of a projecting pin.

3. A tool as claimed in claim 1 wherein the blade is helical in configuration.

4. A tool as claimed in claim 1 wherein said at least one recess in the form of one or more elongate grooves comprising said air space.

5. A tool as claimed in claim 4 wherein the recess is positioned in a first surface of the blade against the surface of the channel from which the safety member projects.

6. A tool as claimed in claim 4, wherein the clamping means clamp the first surface of the blade against the surface of the recess from which the safety member projects.

7. A tool as claimed in claim 1 wherein said blade is provided with a cutting edge arranged at least partially to project from the tool body and a rear surface opposite said edge, the tool body being provided with a passageway substantially traversing the body in a plane passing through the longitudinal centre line of said channel and communicating with said channel at a region adjacent said rear surface of the blade, an adjustment member being received in said passageway and capable of lengthwise movement therein to project from the passageway into the channel by a pre-determined amount, the construction and arrangement being such that the extent of projection of the adjustment member into the channel determines the extent to which the blade cutting edge projects from the tool body and thereby determines the operative diameter of the rotary tool.

8. A tool as claimed in claim 7 wherein the adjustment member is screw-threaded.

* * * * *